United States Patent [19]

Harrison

[11] 4,100,929
[45] Jul. 18, 1978

[54] ACROSS THE LINE PLUGGING APPARATUS AND METHOD

[75] Inventor: George W. Harrison, Houston, Tex.

[73] Assignee: Team, Inc., Alvin, Tex.

[21] Appl. No.: 710,585

[22] Filed: Aug. 2, 1976

[51] Int. Cl.² .................. F16L 55/10; F16K 43/00
[52] U.S. Cl. ................................ 137/15; 29/157 T; 137/318; 137/319; 138/89; 228/161
[58] Field of Search ............... 137/15, 317, 318, 319, 137/320, 322; 138/89, 94, 98; 251/319, 332, 333; 29/157 T, 401 R; 228/161, 173 F

[56] References Cited

U.S. PATENT DOCUMENTS

| | | | |
|---|---|---|---|
| 2,099,841 | 11/1937 | Connell | 251/319 |
| 3,036,594 | 5/1962 | Salisbury | 251/332 |
| 3,291,156 | 12/1966 | Corsano | 138/89 |
| 3,511,254 | 5/1970 | Dyer et al. | 138/89 |
| 3,513,875 | 5/1970 | Nelson | 137/322 |
| 3,586,056 | 6/1971 | Kipp et al. | 138/89 |
| 3,799,182 | 3/1974 | Long | 137/15 |
| 3,948,282 | 4/1976 | Yano | 137/15 |

Primary Examiner—Martin P. Schwadron
Assistant Examiner—G. L. Walton
Attorney, Agent, or Firm—Guy E. Matthews

[57] ABSTRACT

A new and improved method and apparatus for plugging a branch line connection from a main line connection includes welding a suitable flange connection to the main line across from said branch line, tapping the walls of the main line from the flange connection to the branch line and positioning a plugging member adjacent and in said branch line wherein the plugging member seals against the inner surface of the main line which is normally smooth and also enables the pressure in the main line to further enhance the seal by enabling the pressure from the main line to exert pressure on the rear of the plug to seal against such main line immediately adjacent and around the periphery of the opening of the branch line.

8 Claims, 5 Drawing Figures

ACROSS THE LINE PLUGGING APPARATUS AND METHOD

SUMMARY OF THE INVENTION AND PRIOR ART

This invention relates to a new and improved across the line plugging apparatus and method. In the prior art it is known to tap into a main line directly across from a branch line and insert a tapered plug through the tap and into the branch line. However, such method and apparatus was ineffective because of the irregularity and roughness of the opening between the branch line and the main line which thus prevented obtaining a proper seal.

In other prior art uses, it was known to insert one or more plugs in the main line downstream and upstream of the branch line to effectuate a plugging off or stopping up of the branch line. This method proved ineffective because of the lack of desirability in plugging the main line.

IN THE DRAWINGS

IN THE SPECIFICATION

Figure 1:
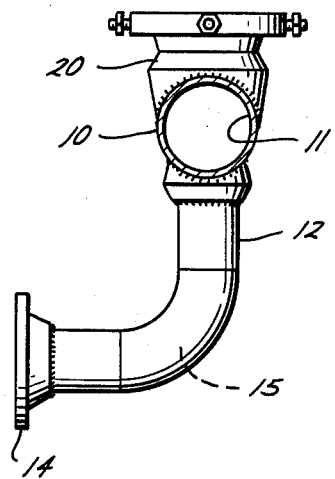
FIG. 1 is a side view of a branch connection and main line.
Figure 2:
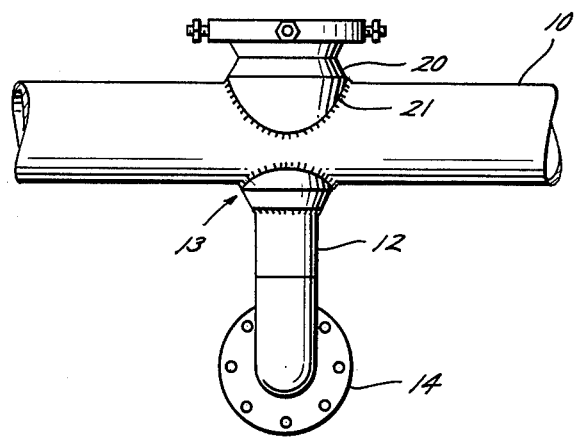
FIG. 2 is a top view of the branch connection and main line.

As illustrated in FIGS. 1 and 2, a main line is generally illustrated at 10 and, as well known in the art is a conduit or the like for carrying steam or other fluids between desired locations, and includes an interior opening 11. A branch line 12 communicates with the interior 11 for transmitting fluids, steam and the like into and out of such main line 10 as is well known in the art.

As further illustrated, the branch line 12 is shown as being welded as at 13 to the main line 10 and includes a flange 14 thereon for connection with other lines, valves or the like.

Figure 3:
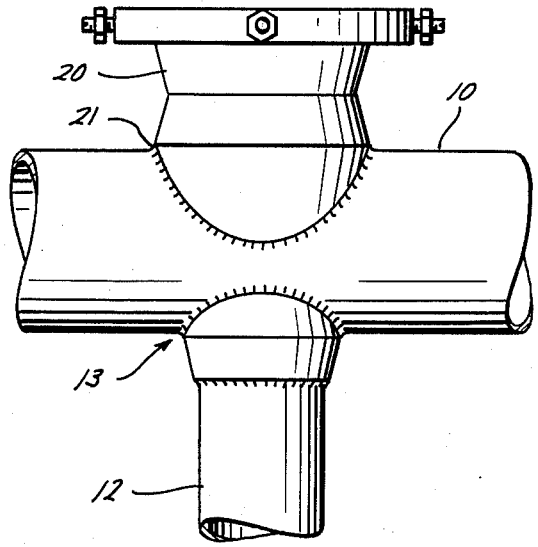
FIG. 3 is another view of the main line, tap connection and branch line.

When it is desired to plug or block the interior 15 of the branch line 12, to prevent communication between the branch line 12 and the main line 10 a flange member 20 is welded as at 21 to such main line 10 (FIG. 3) and a suitable hot tap (as is known in the art) is drilled to form an opening 25 in the main line 10 immediately adjacent and across from an opening 27 (FIG. 5) of the branch line 12 into the main line 10.

Figure 4:
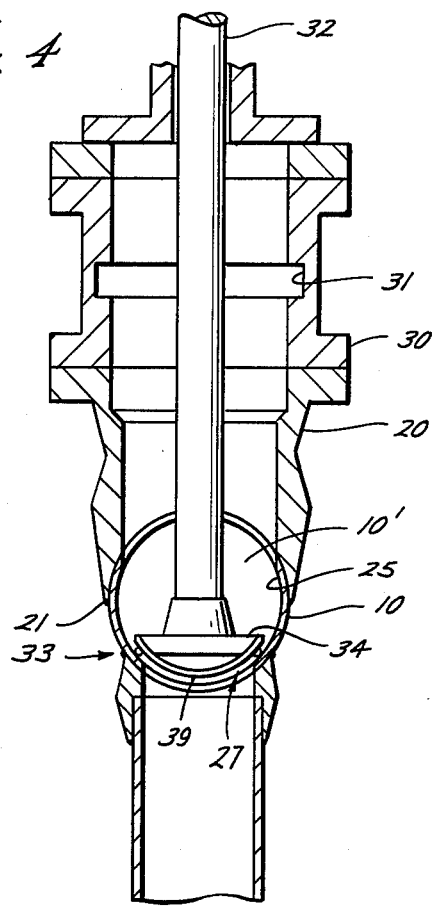
FIG. 4 is a sectional view of the tap connection, the main line, and plug of the present invention inserted to plug the branch connection.

As further illustrated in FIG. 4 a suitable plugging machine such as set forth in my co-pending U.S. patent application Ser. No. 685,351 is mounted with the flange member 20 with a matching suitable valve flange and valve body 30, sealing means 31 and stopper plug shaft 32 as disclosed in such application. A plug member generally illustrated at 33 is mounted on the end of such shaft 32 and the shaft 32 is moved inardly such that the plug moves into the opening 10' of the main line 10. As illustrated in FIG. 4, such plug 33 is positioned around the periphery of the opening 27 communicating the branch line 12 with the interior 10' of the main line to seal off or block such opening 27.

Figure 5:
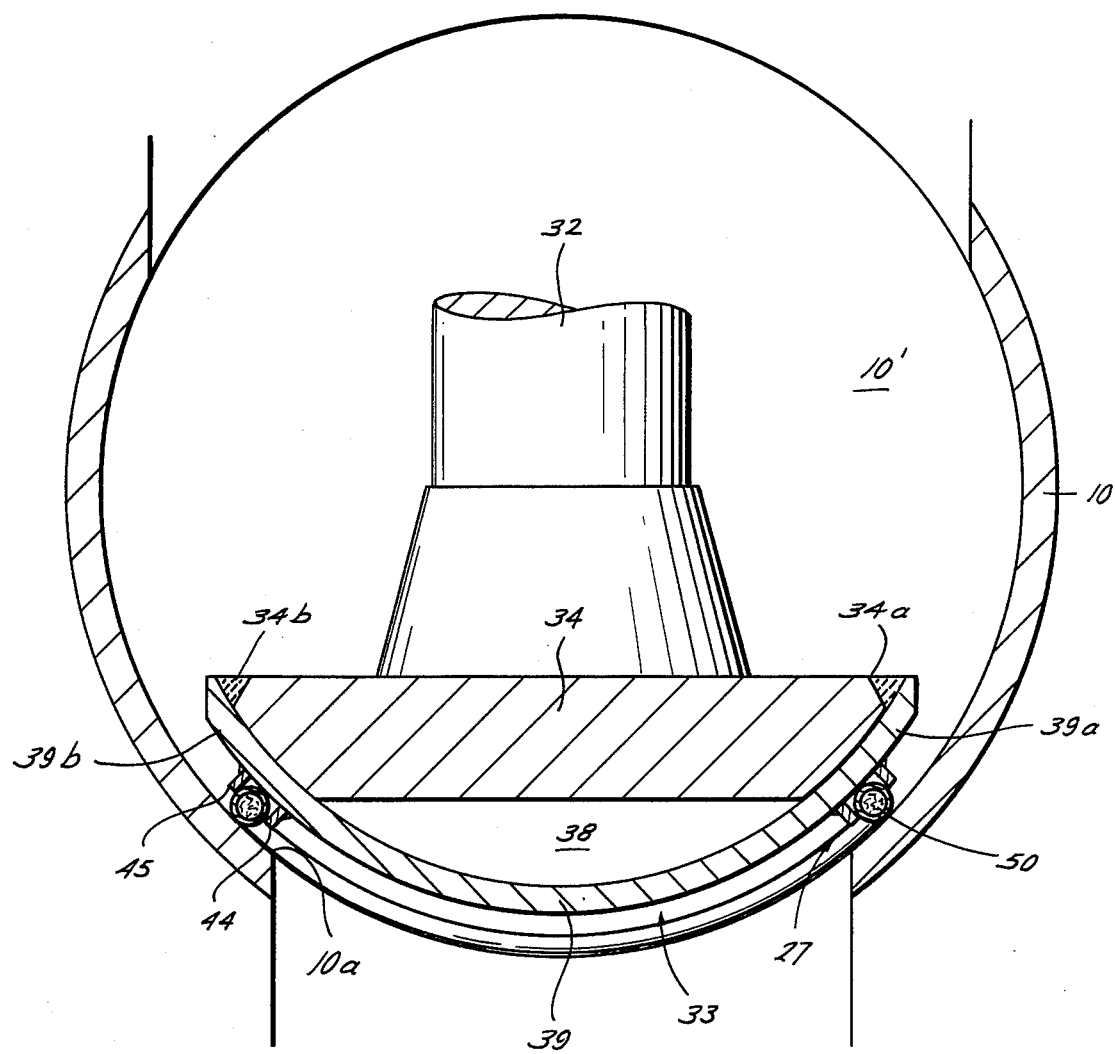
FIG. 5 is a detailed sectional view of the plug, the branch line and the main line.

As further illustrated in FIG. 5, the plug member 33 includes a back or rear portion 34 mounted with such shaft member 32 with the rear portion 34 including spaced support arms for enabling communication of the interior 10' of the main line 10 with an interior space 38 of the plug 33.

An arcuate curved sealing head 39 is secured by welding at each of its ends 39A and 39B to each end 34A and 34B, respectively, of the back member or arms 34 to define an arcuate face as illustrated in FIG. 5. A pair of spaced O ring support ribs 44 and 45 receive an O-ring 50 mounted on the front face 39A of the arcuate curved head 39 of the plug 33.

As further illustrated in FIG. 5, O-ring 50, which is retained by the O-ring ribbed members 44 and 45 extends circumferentially on the surface 39A of the head 39 of plug 33 such that when the shaft 32 of the valve plugging machine is manipulated and the plug 33 is moved adjacent the opening 27 communicating between the interior 10' of the main line 10 and the branch line 12, such O-ring sealingly contacts and abuts the inner circumferential surface 10A of the inner surface 11 of line 10 immediately adjacent the opening 27 of the branch line 12.

Since the interior surface 11 of the main line 10 is normally a smooth surface, the O-ring 50 seals against such interior surface 10A and the head 39 and O-ring 50 thus preventing communication through the opening 27 between the branch line 12 and main line 10 to thereby sealingly plug or block the branch line 12.

It should be further understood that since the backing member 34 is actually spaced support arms that the inner space 38 of plug member 33 communicates with the interior 10' of the main line 10 and when such main line 10 has fluids flowing therethrough, pressure is exerted against the interior face 39B of the head member 39 to exert pressure in the direction of the arrow 54 to force such plug further in the opening 27 and to further force such O-ring 50 into sealing contact with the interior surface 10A of the main line 10.

I claim:

1. A method of sealing across a main line to plug a branch line having an opening therein communicating with the interior of the main line comprising the steps of:
    (a) forming an opening in the main line across from the opening between the branch line and the main line;
    (b) inserting a plug through the formed opening and into the main line;
    (c) forming a sealing engagement between the plug and the circumferential periphery of the main line around the opening communicating the branch line with the main line; and
    (d) inserting at least a portion of the plug inwardly into the opening communicating the branch line with the main line.

2. The method of sealing set forth in claim 1, including the step of welding a flange member to the main line where the opening is to be formed; and
    mounting a valve body to the flange member for inserting the plug into the main line.

3. An apparatus for enabling plugging of the interior of a branch line which communicates with the interior of a main line, such apparatus including:
    a plug having a curved arcuate exterior face positioned in the opening between the branch line and the main line, said plug including an O ring positioned on said curved arcuate face of such plug, said O ring being in sealing engagement with the interior of such main line around the circumferential extent of the opening communicating between the branch line and the main line and a portion of said curved exterior face of said plug extending inwardly into the opening between the main line and the branch line to thereby sealingly prevent communication between the main line and branch line.

4. The apparatus of claim 1, wherein said plug has a rear portion for mounting said plug with a shaft to permit insertion of the plug through a valve body when plugging the interior of the branch line.

5. The apparatus of claim 4, wherein said plug has spaced support arms mounted with the back portion for enabling communication of the interior of the main line with an interior space of said plug.

6. The apparatus of claim 5, wherein the curved arcuate face of said plug is defined by the front of an arcuate curved head mounted with the spaced support arms.

7. The apparatus of claim 6, wherein a pair of spaced O-ring support ribs are mounted with the face of the curved head for receiving the O-ring.

8. The apparatus of claim 1, wherein said plug has a rear portion, the curved arcuate face of said plug is the front of an arcuate curved head and a pair of spaced O-ring support ribs are mounted with the face of the curved head for receiving the O-ring.

* * * * *